US009699638B2

(12) United States Patent
Hong et al.

(10) Patent No.: US 9,699,638 B2
(45) Date of Patent: Jul. 4, 2017

(54) APPARATUS AND METHOD FOR PROVIDING INTEGRATED DEVICE INFORMATION

(71) Applicant: Samsung Electronics Co., Ltd., Gyeonggi-do (KR)

(72) Inventors: Seung-Pyo Hong, Seoul (KR); Sung-Sik Jang, Gyeonggi-do (KR); Dong-Wook Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 57 days.

(21) Appl. No.: 14/151,173

(22) Filed: Jan. 9, 2014

(65) Prior Publication Data

US 2014/0192681 A1    Jul. 10, 2014

(30) Foreign Application Priority Data

Jan. 9, 2013  (KR) .................. 10-2013-0002680
Oct. 18, 2013  (KR) .................. 10-2013-0124787

(51) Int. Cl.
*H04W 8/00* (2009.01)
*H04M 1/725* (2006.01)
*H04W 88/06* (2009.01)

(52) U.S. Cl.
CPC ........ *H04W 8/005* (2013.01); *H04M 1/72583* (2013.01); *H04M 2250/02* (2013.01); *H04M 2250/06* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 2005/0096084 A1 | 5/2005 | Pohja et al. | |
| 2008/0057912 A1* | 3/2008 | Deprun | H04W 48/10 455/413 |
| 2010/0015919 A1* | 1/2010 | Tian | H04W 8/005 455/41.2 |
| 2010/0150112 A1* | 6/2010 | Lee | H04W 48/16 370/332 |
| 2011/0149806 A1 | 6/2011 | Verma et al. | |
| 2012/0158839 A1 | 6/2012 | Hassan et al. | |
| 2012/0191780 A1 | 7/2012 | Sato et al. | |

(Continued)

*Primary Examiner* — Chirag Shah
*Assistant Examiner* — Srinivasa Reddivalam
(74) *Attorney, Agent, or Firm* — The Farrell Law Firm, P.C.

(57) ABSTRACT

An apparatus and a method for providing integrated device information are provided. The apparatus includes a communication unit that transmits and receives data through a first type of wireless communication and a second type of wireless communication; and a controller that discovers a first wireless communication device supporting the first type of wireless communication, receives first wireless communication device information from the discovered first wireless communication device, discovers a second wireless communication device supporting the second type of wireless communication, receives second wireless communication device information from the discovered second wireless communication device, integrates the first wireless communication device information and the second wireless communication device information, and displays the integrated wireless communication device information.

18 Claims, 3 Drawing Sheets

(56) References Cited

U.S. PATENT DOCUMENTS

| | | | |
|---|---|---|---|
| 2012/0208462 A1 | 8/2012 | Lee et al. | |
| 2012/0243524 A1 | 9/2012 | Verma et al. | |
| 2012/0297229 A1* | 11/2012 | Desai | H04W 76/023 713/340 |
| 2013/0065627 A1* | 3/2013 | Jung | H04W 76/023 455/515 |
| 2013/0229930 A1* | 9/2013 | Akay | H04W 52/0245 370/252 |
| 2013/0281146 A1* | 10/2013 | Walton | H04W 48/16 455/515 |
| 2014/0087752 A1* | 3/2014 | Zhu | H04W 24/00 455/456.1 |
| 2016/0037389 A1* | 2/2016 | Tagg | H04L 12/2856 370/331 |

* cited by examiner

APPARATUS AND METHOD FOR PROVIDING INTEGRATED DEVICE INFORMATION

PRIORITY

This application claims priority under 35 U.S.C. §119(a) to Korean Patent Application Serial Nos. 10-2013-0002680 and 10-2013-0124787, which were filed in the Korean Intellectual Property Office on Jan. 9, 2013 and on Oct. 18, 2013, respectively, the content of each of which is incorporated herein by reference.

BACKGROUND OF THE INVENTION

1. Field of the Invention

The present invention relates generally to an apparatus and a method for providing device information, and more particularly, to an apparatus and a method for integrally providing information on a device supporting a first type of wireless communication, such as Wi-Fi Direct, and information on a device supporting a second type of wireless communication, such as Bluetooth.

2. Description of the Related Art

Using a portable terminal, a user can perform a file transmission after discovering and connecting to another portable terminal. For example, in response to a request from the user to discover devices supporting Bluetooth, the portable terminal provides a separate user interface for discovering Bluetooth devices. Similarly, in response to a request from the user to discover devices supporting Wi-Fi Direct, the portable terminal provides a separate user interface for discovering Wi-Fi Direct devices.

As described above, a conventional portable terminal provides separate user interfaces for discovering devices supporting separate types of wireless communication.

Accordingly, a user of the conventional portable terminal is often inconvenienced in that the user must use different interfaces.

Therefore, there is a need for an apparatus and a method for providing integrated device information.

SUMMARY

Accordingly, the present invention is designed to address at least the problems and/or disadvantages described above and to provide at least the advantages described below.

Accordingly, an aspect of the present disclosure is to provide an apparatus and a method that provide integrated information on devices supporting different types of wireless communication, such as Wi-Fi Direct and Bluetooth.

In accordance with an aspect of the present disclosure, an apparatus for providing integrated device information is provided. The apparatus includes a communication unit that transmits and receives data through a first type of wireless communication and a second type of wireless communication; and a controller that discovers a first wireless communication device supporting the first type of wireless communication, receives first wireless communication device information from the discovered first wireless communication device, discovers a second wireless communication device supporting the second type of wireless communication, receives second wireless communication device information from the discovered second wireless communication device, integrates the first wireless communication device information and the second wireless communication device information, and displays the integrated wireless communication device information.

In accordance with another aspect of the present disclosure, a method for providing integrated device information is provided. The method includes discovering a first wireless communication device supporting a first type of wireless communication; receiving first wireless communication device information from the first wireless communication device; discovering a second wireless communication device supporting a second type of wireless communication; receiving second wireless communication device information from the second wireless communication device; integrating the received first wireless communication device information and the received second wireless communication device information; and displaying the integrated wireless communication device information.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Although the description below will reference Wi-Fi Direct and Bluetooth as the different types of wireless communication, the embodiments of the present invention described below are also applicable to more than two and different types of wireless communication.

Figure 1:
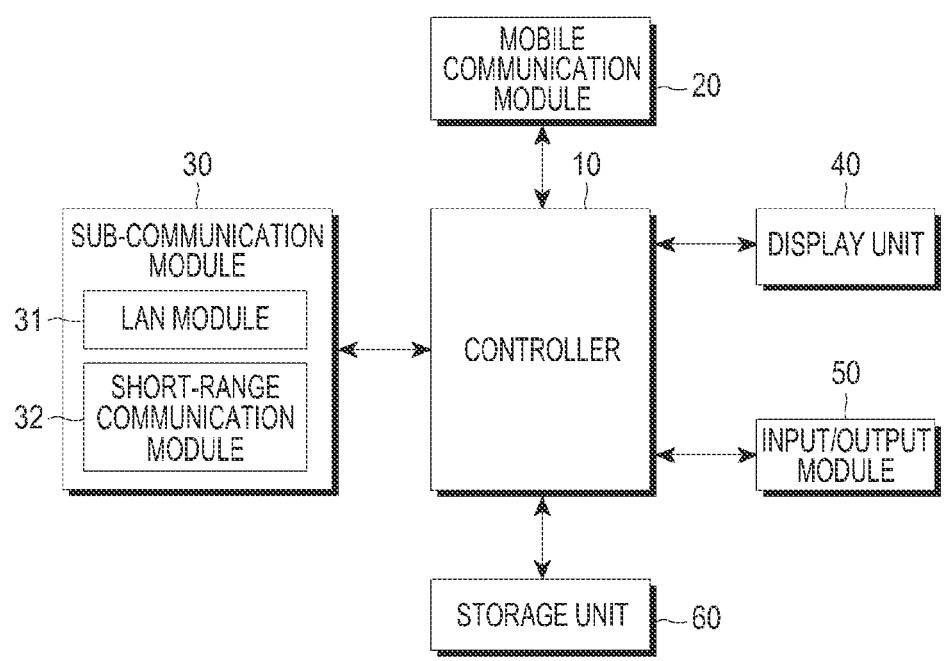
FIG. 1 is a block diagram illustrating an apparatus for providing integrated device information according to an embodiment of the present invention.

FIG. 1 is a block diagram illustrating an apparatus for providing integrated device information according to an embodiment of the present invention.

Referring to FIG. 1, the apparatus includes a controller 10, a mobile communication module 20, a sub-communication module 30, a display unit 40, an input/output module 50, and a storage unit 60.

The controller 10 controls the overall operation of the apparatus, and particularly, controls the mobile communication module 20, the sub-communication module 30, the display unit 40, the input/output module 50, and the storage unit 60.

More specifically, when a request is made to discover devices supporting multiple types of wireless communication, the controller 10 scans for devices supporting any of the multiple wireless communication. As a result of the scanning, the controller 10 receives device information from the scanned devices. For example, the device information may include the name of the scanned device, connection information of a type of wireless communication supported by the scanned device, the name of the scanned device in the wireless communication supported by the scanned device, etc.

For example, when a request is made to discover devices supporting Wi-Fi Direct or Bluetooth, the controller 10 scans for devices supporting Wi-Fi Direct. When the controller 10 identifies a wireless communication device supporting Wi-Fi Direct, the controller 10 receives device information from the wireless communication device. Similarly, when the controller 10 identifies a device that simultaneously supports Wi-Fi Direct and Bluetooth, the controller 10 receives device information from the device.

When a request is made to discover a device supporting at least one of Wi-Fi Direct and Bluetooth, the controller 10 scans through a short-range communication module 32 of the sub-communication module 30, and receives Wi-Fi Direct device information on an identified device supporting Wi-Fi Direct through the short-range communication module 32. For example, the received Wi-Fi Direct device information may include a device name of the device supporting Wi-Fi Direct, a Wi-Fi Direct Media Access Control (MAC) address of the device, a Wi-Fi Direct name of the device, etc.

When the device supporting Wi-Fi Direct also supports Bluetooth, the received device information further includes Bluetooth information on the relevant device. For example, the Bluetooth information may include a device name, a Bluetooth name of the device, a Bluetooth MAC address of the device, etc.

The service discovery operation in Wi-Fi Direct can be used to discover a list on all services provided by a Peer to Peer (P2P) device, information on one service provided by the P2P device, information on complex services provided by the P2P device, and information on whether there is a change in a service provided by the P2P device.

In accordance with an embodiment of the present disclosure, device information is included in a vendor specific body of a Generic Advertisement Service (GAS) initial request frame of a service discover query frame and the vendor specific body thereof including device information is transmitted, according to a P2P standard of Wi-Fi Direct. The device information may include a device name in the form of Extensible Markup Language (XML), a Bluetooth MAC address of the device, and a Bluetooth device name.

The device information may be transmitted in methods other than a method in which the device information is transmitted in a state of being included in the GAS initial request frame.

In accordance with an embodiment of the present disclosure, a request device supporting Wi-Fi Direct includes a Peer to Peer Information Element (P2P IE) in a probe request frame and may transmit the probe request frame including the P2P IE, in a discovery step. The P2P IE may include a vendor specific attribute field. The request device may include an instruction, which requests information related to Bluetooth, in the probe request frame, and may transmit the probe request frame including the instruction that requests the information related to Bluetooth. When receiving the probe request frame, a response device capable of parsing the instruction included in the probe request frame transmits a probe response frame, in which a P2P IE includes Bluetooth information, to the request device, and thereby the request device acquires the Bluetooth information together with the Wi-Fi Direct information in a process for discovering a Wi-Fi Direct device.

In accordance with an embodiment of the present disclosure, a request device includes, by default, a Bluetooth address in a vendor specific attribute field of a P2P IE in a probe request frame, advertises the probe request frame in which the Bluetooth address is included in the vendor specific attribute field of the P2P IE, and notifies a counterpart device of a Bluetooth MAC address of the request device. When receiving a probe request message or a probe response message including the Bluetooth address, a response device parses the vendor specific attribute field, and thereby directly acquires a Wi-Fi Direct address of the request device and the Bluetooth address of the request device. As a result, the Bluetooth address and the Wi-Fi Direct address can be acquired more quickly.

In accordance with an embodiment of the present disclosure, in order to exchange Wi-Fi Protected Setup (WPS) information (e.g., a push button, a keypad, a display, etc.) before making an attempt to make a Wi-Fi Direct connection, after discovering a device, devices selectively transmit and receive a provision discovery request frame (or a provision discovery request) and a provision discovery response frame (or a provision discovery response) to/from each other. For example, the provision discovery request frame includes a P2P IE, and a request device includes an instruction requesting information related to Bluetooth in a vendor specific attribute field of the P2P IE. The provision discovery request frame including the instruction is transmitted to the request device.

A response device capable of parsing an instruction included in a provision request message transmits a provision response message in which Bluetooth information is included in a P2P IE to the request device, and thereafter, acquires Bluetooth information with Wi-Fi Direct information before making a Wi-Fi Direct connection.

The controller 10 controls the storage unit 60 to store the received device information, enters a standby state for the Wi-Fi Direct connection, and scans for a device supporting Bluetooth.

When the controller 10 enters the standby state for a Wi-Fi Direct connection, a Wi-Fi Direct connection is continuously made. The controller 10 switches from the standby state to a stop state to temporarily stop a connection standby during a preset time period, and scans a Bluetooth device. For example, the preset time period may be equal to 2 to 3 seconds, and may be variously set.

When the controller 10 identifies devices supporting Bluetooth, the controller 10 receives device information from the devices, and controls the storage unit 60 to store the received device information.

Thereafter, controller 10 integrates the device information on the devices supporting Wi-Fi Direct and the device information on the devices supporting Bluetooth, which are stored in the storage unit 60, configures the integrated device information as one interface, and controls the display unit 40 to display the integrated device information.

Basically, when the controller 10 identifies devices supporting Bluetooth, the controller 10 controls the short-range communication module 32 to receive device information on the devices, and controls the storage unit 60 to store the received device information on the devices.

Thereafter, the controller 10 switches from the stop state to a standby state for a Wi-Fi Direct connection.

The controller 10 integrates the collected Bluetooth device information with the collected Wi-Fi Direct device information, which are stored in the storage unit 60, and then configures the integrated device information into one interface, and controls the display unit 40 to display the integrated device information.

The controller 10 compares the Wi-Fi Direct device information with the Bluetooth device information. More specifically, typically, a user apparatus has locality such that the user device again encounters a device that the user device has once discovered. Accordingly, based on the locality, the user device caches Bluetooth information and Wi-Fi Direct information on the device that the user device has once acquired, and thereby can directly acquire Bluetooth MAC information and Wi-Fi Direct MAC information without additionally operating a probe message, a provision message and a service discovery message in Wi-Fi Direct, whenever the user device discovers a device.

When the user apparatus does not use a cache, the user apparatus discovers a Wi-Fi Direct device supporting Wi-Fi Direct through a probe request message or a probe response message in Wi-Fi Direct, and acquires Bluetooth MAC addresses of the Wi-Fi Direct devices discovered through a service discovery process. The user device delivers the device information and the Bluetooth MAC addresses of the Wi-Fi Direct devices as acquired above, to a higher application.

When the user apparatus uses the cache, the user apparatus discovers a Wi-Fi Direct device supporting Wi-Fi Direct through a probe request message or a probe response message in Wi-Fi Direct, and acquires Bluetooth MAC addresses of the Wi-Fi Direct devices discovered through a service discovery process. Thereafter, the user apparatus adds, to the cache of the user apparatus, the Bluetooth MAC addresses of the discovered Wi-Fi Direct devices and Wi-Fi Direct MAC addresses of the discovered Wi-Fi Direct devices in such a manner as to match the Bluetooth MAC addresses of the discovered Wi-Fi Direct devices to the Wi-Fi Direct MAC addresses of the discovered Wi-Fi Direct devices.

When the user apparatus discovers a Wi-Fi Direct device in the next discovery step, the user apparatus searches the cache of the user device. When the user device discovers a Bluetooth MAC address of the relevant Wi-Fi Direct device in the cache, the user apparatus can deliver the Bluetooth MAC address and the Wi-Fi Direct MAC address of the relevant Wi-Fi Direct device to a higher application without performing a service discovery process. When the user apparatus fails to discover the Bluetooth MAC address of the relevant Wi-Fi Direct device in the cache, the user apparatus inquires of the relevant Wi-Fi Direct device about a Bluetooth address through a service discovery process.

Additionally, the user apparatus may share, with another user apparatus, a Bluetooth MAC address and a Wi-Fi Direct MAC address that the user apparatus has acquired by using a Wi-Fi Direct probe message.

The request device includes an instruction requesting information on all pairs of Bluetooth MAC addresses and Wi-Fi Direct MAC addresses that a counterpart device caches, in a vendor specific attribute field of a P2P IE of a probe request message, and transmits the probe request message including the instruction to the response device. When receiving the probe request message, the response device includes information on pairs of Bluetooth MAC addresses and Wi-Fi Direct MAC addresses that the response device caches, in a vendor specific attribute field of a probe response message, and transmits the probe response message including the information, to the request device.

When receiving the probe response message, the request device stores, in a cache thereof, the information on the pairs of Bluetooth MAC addresses and Wi-Fi Direct MAC addresses assigned to the counterpart device.

When a result of the comparison shows that the Wi-Fi Direct device information collected by scanning a Wi-Fi Direct device corresponds to the Bluetooth device information collected by scanning a Bluetooth device, the controller 10 performs a control operation for displaying the relevant device, indicating that the relevant device supports both Wi-Fi Direct and Bluetooth. When there is no Bluetooth device information collected by scanning a Bluetooth device that corresponds to the Wi-Fi Direct device information collected by scanning a Wi-Fi Direct device, the controller 10 performs a control operation for displaying the relevant device in such a manner that the relevant device supports only Wi-Fi Direct.

For example, a device supporting Wi-Fi Direct and Bluetooth comprises Wi-Fi Direct device information and Bluetooth device information. The Wi-Fi Direct device information and Bluetooth device information of the device supporting Wi-Fi Direct and Bluetooth is collected by scanning a Wi-Fi Direct device.

When collecting the Wi-Fi Direct device information and Bluetooth device information, and then powering on a Wi-Fi Direct module and powering off a Bluetooth module of the device supporting Wi-Fi Direct and Bluetooth, the Bluetooth device information of the device supporting Wi-Fi Direct and Bluetooth is not collected by scanning a Bluetooth device.

When there is Bluetooth device information collected by scanning a Bluetooth device which coincides with the Bluetooth device information of the device supporting Wi-Fi Direct and Bluetooth, the controller displays the Wi-Fi Direct device information and Bluetooth device information of the device supporting Wi-Fi Direct and Bluetooth.

Also, when there is no Bluetooth device information collected by scanning a Bluetooth device which coincides with the Bluetooth device information of the device supporting Wi-Fi Direct and Bluetooth, the controller displays only the Wi-Fi Direct device information of the device supporting Wi-Fi Direct and Bluetooth.

According to the control of the controller 10, the mobile communication module 20 connects the apparatus to an external device through using one or multiple antennas (not illustrated).

The mobile communication module 20 transmits and receives wireless signals for voice calls, video calls, Short Message Service (SMS) messages, a Multimedia Messaging Service (MMS) messages, and the like to/from a mobile phone (not illustrated), a smart phone (not illustrated), a tablet Personal Computer (PC) or another device (not illustrated), which has a telephone number input to the apparatus.

The sub-communication module 30 includes a wireless Local Area Network (LAN) module 31 and a short-range communication module 32. Alternatively, the sub-communication module 30 one of the wireless LAN module 31 and the short-range communication module 32.

According to the control of the controller 10, the wireless LAN module 31 may be connected to the Internet at a place where a wireless Access Point (AP) (not illustrated) is installed. The wireless LAN module 31 supports a wireless LAN standard (e.g., IEEE 802.11x of the Institute of Electrical and Electronics Engineers (IEEE)). According to the control of the controller 10, the short-range communication module 32 performs short-range wireless communication with an image forming device (not illustrated). Examples of a short-range communication scheme may include Bluetooth, Infrared Data Association (IrDA), Wi-Fi Direct communication, NFC, etc.

The display unit 40 displays information entered by the user or various pieces of information provided to the user, including a menu of various functions executed by the apparatus.

The input/output module 50 includes at least one input/output device, such as at least one of multiple buttons, a microphone, a speaker, a vibration motor, a connector and a keypad.

According to the control of the control unit 10, the storage unit 60 stores signals and/or data that is input or output in response to operations of the mobile communication module 20, the sub-communication module 30, the display unit 40, and the input/output module 50. The storage unit 60 may also store a control program for controlling the apparatus or a control program for the controller 10, and applications. For example, the storage unit 60 stores Wi-Fi Direct device information collected by scanning a Wi-Fi Direct device, Bluetooth device information collected together with the Wi-Fi Direct device information, Bluetooth device information collected by scanning a Bluetooth device, etc.

Herein, the term "storage unit" refers to any one of or a combination of the storage unit 60, a Read Only Memory (ROM) and a Random Access Memory (RAM) within the controller 10, or a memory card (not illustrated), such as a Secure Digital (SD) card or a memory stick, which is mounted on the apparatus. The storage unit may include a non-volatile memory, a volatile memory, a Hard Disk Drive (HDD), a Solid State Drive (SSD), etc.

Figure 2:
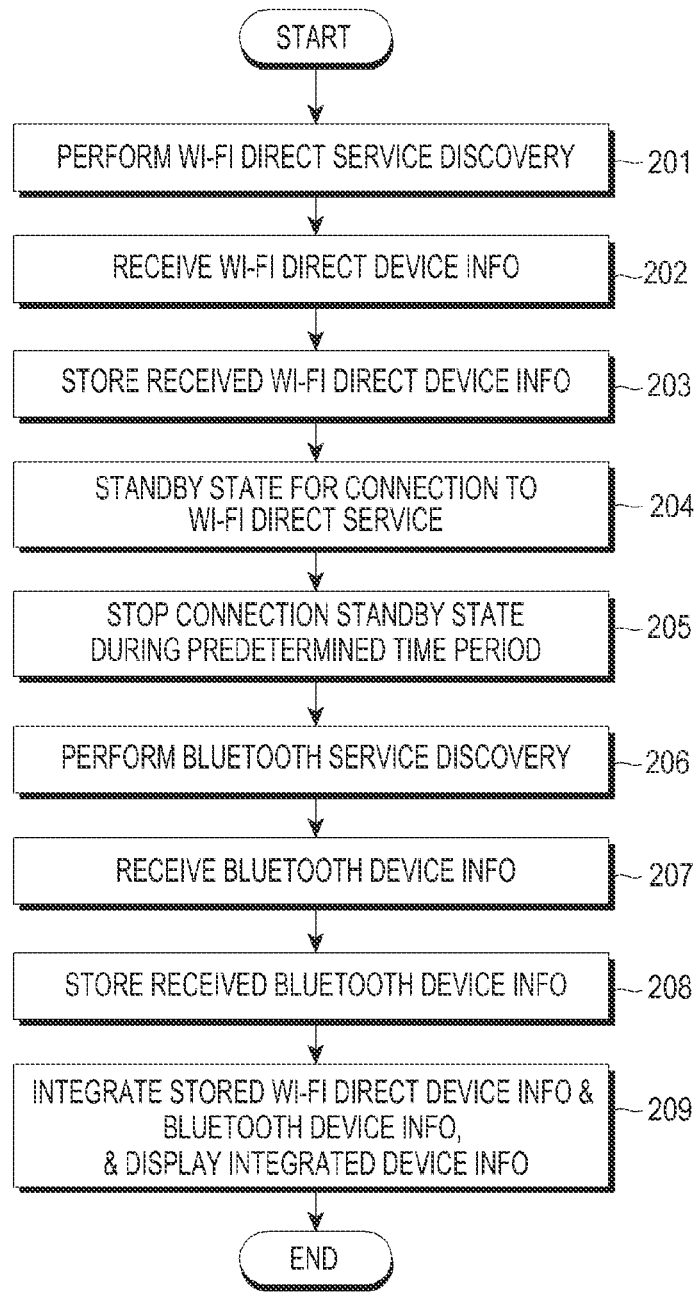
FIG. 2 is a flowchart illustrating a method for integrally providing information on devices supporting different types of wireless communication according to an embodiment of the present invention.

FIG. 2 is a flowchart illustrating a method for integrally providing information on devices supporting different types of wireless communication according to an embodiment of the present invention.

Referring to FIG. 2, the controller 10 performs a Wi-Fi Direct service discovery in step 201. In step 201, the controller 10 scans for Wi-Fi Direct devices supporting Wi-Fi Direct.

In step 202, the controller 10 receives Wi-Fi Direct device information from a scanned device.

In step 203, the controller 10 stores the received Wi-Fi Direct device information in the storage unit 60.

In step 204, the controller 10 enters a standby state for connection to a Wi-Fi Direct service. Herein, the term "standby state" refers to a state of waiting for connection to a Wi-Fi Direct service.

In step 205, the controller 10 stops the connection standby state for a predetermined time period. For example, the controller 10 stops the standby state for connection to a Wi-Fi Direct service for 3 seconds.

In step 206, the controller 10 performs a Bluetooth service discovery for discovering a device supporting Bluetooth.

In step 207, the controller 10 receives Bluetooth device information an identified device.

In step 208, the controller 10 stores the received Bluetooth device information in the storage unit 60.

In step 209, the controller 10 integrates the stored Wi-Fi Direct device information and the stored Bluetooth device information, and displays the integrated device information.

More specifically, the controller 10 compares the Wi-Fi Direct device information collected by scanning a Wi-Fi Direct device with the Bluetooth device information collected by scanning a Bluetooth device. When a result of the comparison shows that the Wi-Fi Direct device information collected by scanning a Wi-Fi Direct device corresponds to the Bluetooth device information collected by scanning a Bluetooth device, the controller 10 displays the relevant device, indicating that the relevant device supports both Wi-Fi Direct and Bluetooth. However, when there is no Bluetooth device information collected by scanning a Bluetooth device that corresponds to the Wi-Fi Direct device information collected by scanning a Wi-Fi Direct device, the controller 10 displays the relevant device, indicating that the relevant device supports only Wi-Fi Direct.

Figure 3:
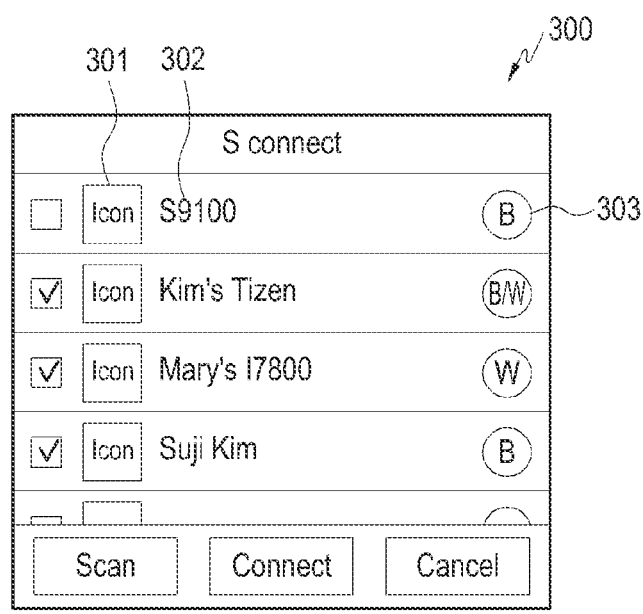
FIG. 3 illustrates an example of a user interface that is displayed on an apparatus providing integrated device information according to an embodiment of the present invention.

FIG. 3 illustrates an example of a user interface that is displayed on an apparatus providing integrated device information according to an embodiment of the present invention.

Referring to FIG. 3, the controller 10 displays a user interface 300 including an icon 301 indicating a type of device (e.g., a mobile phone, a tablet PC, etc.), a device name 302, an icon 303 indicating a network scheme or schemes supported by the device, through the display unit 40. For example, the controller 10 indicates that a device supports Bluetooth by using an icon B, indicates that a device supporting both Bluetooth and Wi-Fi Direct by using an icon B/W, and indicates that a device supports Wi-Fi Direct by using an icon W.

As described above, information on a device supporting a first type of wireless communication, such as Wi-Fi Direct, and information on a device supporting a second type of wireless communication, such as Bluetooth, are integrated in order to provide one user interface, which more conveniently and easily displays device information.

Additionally, it may be appreciated that the above-described embodiments of the present disclosure can be implemented in software, hardware, or a combination thereof. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It will be appreciated that the method for providing integrated device information according to embodiments of the present disclosure may be implemented by using a computer or a portable terminal including a controller and a storage unit (or a memory), and that the storage unit is an example of a non-transient machine-readable storage medium suitable for storing a program or programs including instructions for implementing the embodiments of the present disclosure. Accordingly, the present disclosure includes a program for a code implementing the apparatus and method described in the appended claims of the specification and a machine (a computer or the like)-readable storage medium for storing the program. Moreover, such a program as described above can be electronically transferred through an arbitrary medium such as a communication signal transferred through cable or wireless connection, and the present disclosure properly includes the things equivalent to that.

Also, the apparatus for providing device information may receive and store the program from a device for providing a program, which is connected by wire or wirelessly to the apparatus for providing device information. The device for providing a program may include a memory for storing a program including instructions which cause the apparatus for providing device information to perform a previously-set method for providing device information, information required to provide device information, etc.; a communication unit for performing wired or wireless communication with the apparatus for providing device information; and a controller for performing a control operation for transmitting the relevant program to the apparatus for providing device information at a request from the apparatus for providing device information or automatically.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. An apparatus for providing integrated device information, the apparatus comprising:
    a communication unit that transmits and receives data through a first wireless communication and a second wireless communication; and
    a controller configured to:
        discover a first device currently performing the first wireless communication,
        when the first device also supports the second wireless communication, receive, from the first device through the first wireless communication, first information including both first wireless communication information and second wireless communication information,
        discover a second device currently performing the second wireless communication,
        receive, from the second device through the second wireless communication, second information including second wireless communication information,
        when the second wireless communication information included in the first information matches with the second wireless communication information included in the second information, display a first icon corresponding to the first device together with a first indicator indicating that the first device currently performs both the first wireless communication and the second wireless communication, and
        when the second wireless communication information included in the first information does not match with the second wireless communication information included in the second information, display the first icon corresponding to the first device together with a second indicator, different from the first indicator, indicating that the first device currently performs only the first wireless communication.

2. The apparatus of claim 1, wherein the controller is further configured to scan the first device to discover the first device.

3. The apparatus of claim 2, wherein the controller is further configured to:
    enter a connection standby state for a first wireless communication service, after receiving the first information from the first device,
    switch from the standby state to a stop state for temporarily stopping the connection standby for a preset time period,
    scan the second device to discover the second device, and receive the second information from the second device.

4. The apparatus of claim 3, wherein the controller is further configured to switch from the stop state to the connection standby state, after receiving the second information from the second device.

5. The apparatus of claim 1, wherein the controller is further configured to determine that the first device currently performs only the first wireless communication, if the matching second wireless communication information included in the second information is not received from the first second device while discovering the second device.

6. The apparatus of claim 1, wherein the controller is further configured to determine that the first device currently performs the second wireless communication, if the matching second wireless communication information included in the second information is received from first second device while discovering the second device.

7. The apparatus of claim 1, wherein the first wireless communication comprises Wi-Fi communication, and the first information comprises:
    a name of a Wi-Fi communication device;
    a Wi-Fi communication Media Access Control (MAC) address;
    a Wi-Fi communication name;
    a name of a Bluetooth device;
    a Bluetooth MAC address; and
    a Bluetooth name.

8. The apparatus of claim 1, wherein the second wireless communication comprises Bluetooth, and the second information comprises:
    a name of a Bluetooth device;
    a Bluetooth Media Access Control (MAC) address; and
    a Bluetooth name.

9. The apparatus of claim 7, wherein the first information is received in a service discover query frame used for service discovery of the Wi-Fi communication device.

10. The apparatus of claim 7, wherein the first information is received in a probe request frame used for service discovery of the Wi-Fi communication device.

11. The apparatus of claim 7, wherein the first information is received in a provision discovery request frame, before making an attempt for a Wi-Fi communication connection, after service discovery of the Wi-Fi communication device is performed.

12. A method for providing integrated device information, the method comprising:
    discovering a first device currently performing a first wireless communication;
    when the first device also supports a second wireless communication, receiving, from the first device through the first wireless communication, first information including both first wireless communication information and second wireless communication information;
    discovering a second device currently performing the second wireless communication;
    receiving, from the second device through the second wireless communication, second information including second wireless communication information,
    when the second wireless communication information included in the first information matches with the second wireless communication information included in the second information, displaying a first icon corresponding to the first device together with a first indicator indicating that the first device currently performs both the first wireless communication and the second wireless communication; and when the second wireless communication information included in the first information does not match with the second wireless communication information included in the second information, displaying the first icon corresponding to the first device together with a second indicator, different from the first indicator, indicating that the first device currently performs only the first wireless communication.

13. The method of claim 12, wherein receiving the second information from the second device comprises:

entering a connection standby state for a first wireless communication service, after receiving the first information from the first device;

switching from the standby state to a stop state for temporarily stopping the connection standby for a preset time period;

scanning the second device to discover the second device; and receiving the second information from the second device during the stop state.

14. The method of claim 13, further comprising switching from the stop state to the standby state, after receiving the second information from the second device.

15. The method of claim 12, further comprising determining that the first device currently performs only the first wireless communication, if the matching second wireless communication information included in the second information is not received from the second device while discovering the second device.

16. The method of claim 12, further comprising determining that the first device currently performs the second wireless communication, if the matching second wireless communication information included in the second information is received from the second device while discovering the second device.

17. The method as claimed in claim 12,
wherein the first wireless communication comprises Wi-Fi communication, and the first information comprises:
a name of a Wi-Fi communication device supporting the Wi-Fi communication;
a Wi-Fi communication Media Access Control (MAC) address;
a Wi-Fi communication name; and
a name of a Bluetooth device supporting Bluetooth;
a Bluetooth MAC address; and
a Bluetooth name.

18. The method as claimed in claim 12, wherein the second wireless communication comprises Bluetooth, and the second information comprises:
a name of a Bluetooth device supporting the Bluetooth;
a Bluetooth Media Access Control (MAC) address; and
a Bluetooth name.

* * * * *